(12) United States Patent
Baek et al.

(10) Patent No.: US 10,742,880 B2
(45) Date of Patent: Aug. 11, 2020

(54) IMAGE DISPLAY APPARATUS AND METHOD OF DISPLAYING IMAGE

(71) Applicant: SAMSUNG ELECTRONICS CO., LTD., Suwon-si (KR)

(72) Inventors: Jong-min Baek, Seoul (KR);
Young-hyun Kim, Suwon-si (KR);
Se-hyun Kim, Daejeon (KR);
Kwan-sik Yang, Suwon-si (KR);
Jae-young You, Hwaseong-si (KR);
Kil-soo Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/794,561

(22) Filed: Oct. 26, 2017

(65) Prior Publication Data

US 2018/0124314 A1    May 3, 2018

(30) Foreign Application Priority Data

Oct. 27, 2016    (KR) .................... 10-2016-0141176

(51) Int. Cl.
*H04N 5/232* (2006.01)
*G06T 3/00* (2006.01)
(Continued)

(52) U.S. Cl.
CPC ..... *H04N 5/23238* (2013.01); *G06F 3/04815* (2013.01); *G06T 3/005* (2013.01); *G06T 3/0062* (2013.01); *G06T 15/205* (2013.01)

(58) Field of Classification Search
CPC ... H04N 5/23238; G06T 3/005; G06T 3/0062; G06T 15/205; G06F 3/04815
See application file for complete search history.

(56) References Cited

U.S. PATENT DOCUMENTS

| 5,786,822 A | 7/1998 | Sakaibara et al. |
| 6,486,908 B1 * | 11/2002 | Chen ..................... G06T 3/0018 345/441 |

(Continued)

FOREIGN PATENT DOCUMENTS

| CN | 102065335 A | 5/2011 |
| CN | 102111672 A | 6/2011 |

(Continued)

OTHER PUBLICATIONS

International Search Report and Written Opinion dated Mar. 28, 2018 issued by the International Searching Authority in counterpart International Patent Application No. PCT/KR2017/011870 (PCT/ISA/220, PCT/ISA/210 & PCT/ISA/237).

(Continued)

*Primary Examiner* — Richard A Hansell, Jr.
(74) *Attorney, Agent, or Firm* — Sughrue Mion, PLLC

(57) ABSTRACT

An image display apparatus and a method of displaying an image are provided. The image display apparatus includes: a display; a graphics processing unit (GPU); and a processor configured to: determine a copy region of a planar-format image based on information regarding a current viewpoint, control the GPU to generate a sphere-format image by mapping an image corresponding to the copy region to a sphere and to generate an output image by rendering the sphere-format image, and control the display to display the output image.

18 Claims, 15 Drawing Sheets

(51) Int. Cl.
*G06T 15/20* (2011.01)
*G06F 3/0481* (2013.01)

(56) References Cited

U.S. PATENT DOCUMENTS

| | | | |
|---|---|---|---|
| 8,274,506 B1* | 9/2012 | Rees | G06T 17/05 |
| | | | 345/419 |
| 8,976,303 B2 | 3/2015 | Murugesan | |
| 9,055,277 B2 | 6/2015 | Katayama | |
| 10,600,153 B2 | 3/2020 | Roimela | |
| 10,628,948 B2 | 4/2020 | Nakazawa | |
| 2009/0041379 A1* | 2/2009 | Shih | G06K 9/32 |
| | | | 382/276 |
| 2011/0119713 A1 | 5/2011 | Chang et al. | |
| 2012/0023599 A1 | 1/2012 | Weinstein et al. | |
| 2012/0174038 A1 | 7/2012 | Tamayo et al. | |
| 2012/0203759 A1* | 8/2012 | Kim | G06F 16/583 |
| | | | 707/710 |
| 2012/0235995 A1 | 9/2012 | Lou et al. | |
| 2013/0050260 A1 | 2/2013 | Reitan | |
| 2013/0100132 A1* | 4/2013 | Katayama | H04N 13/275 |
| | | | 345/420 |
| 2014/0123177 A1 | 5/2014 | Kim et al. | |
| 2014/0176542 A1* | 6/2014 | Shohara | G06T 15/205 |
| | | | 345/420 |
| 2014/0210940 A1 | 7/2014 | Barnes | |
| 2016/0014336 A1 | 1/2016 | Han et al. | |
| 2016/0086306 A1 | 3/2016 | Nishimaki et al. | |
| 2016/0086386 A1 | 3/2016 | Son et al. | |
| 2016/0132991 A1* | 5/2016 | Fukushi | A63F 13/5255 |
| | | | 345/667 |
| 2017/0076429 A1* | 3/2017 | Russell | G06T 3/4038 |
| 2017/0094278 A1* | 3/2017 | Bickerstaff | G06T 5/006 |
| 2017/0186219 A1 | 6/2017 | Xu | |
| 2017/0244948 A1* | 8/2017 | Pang | H04N 5/2226 |
| 2017/0302714 A1* | 10/2017 | Ramsay | H04L 65/601 |
| 2017/0332014 A1* | 11/2017 | Shih | H04N 5/265 |
| 2018/0101931 A1* | 4/2018 | Abbas | G06T 3/0068 |
| 2018/0253879 A1* | 9/2018 | Li | H04N 5/23238 |
| 2018/0374192 A1* | 12/2018 | Kunkel | G06T 15/205 |

FOREIGN PATENT DOCUMENTS

| | | |
|---|---|---|
| CN | 102510474 A | 6/2012 |
| CN | 103339927 A | 10/2013 |
| CN | 103634634 A | 3/2014 |
| CN | 105208368 A | 12/2015 |
| CN | 105898271 A | 8/2016 |
| CN | 105913478 A | 8/2016 |
| CN | 106028115 A | 10/2016 |
| CN | 106060570 A | 10/2016 |
| EP | 1 441 307 A1 | 7/2004 |
| EP | 2 518 686 A1 | 10/2012 |
| JP | 07-210705 A | 8/1995 |
| JP | 8-191419 A | 7/1996 |
| JP | 11-213136 A | 8/1999 |
| JP | 2008-243027 A | 10/2008 |
| JP | 5233926 B2 | 7/2013 |
| JP | 2015-173424 A | 10/2015 |
| JP | 2016-165105 A | 9/2016 |
| WO | 2012/071435 A1 | 5/2012 |
| WO | 2012/132237 A1 | 10/2012 |
| WO | 2016/013634 A1 | 1/2016 |
| WO | 2018/030829 A1 | 2/2018 |

OTHER PUBLICATIONS

Communication dated Apr. 11, 2018 issued by the European Patent Office in counterpart European Patent Application No. 17198706.8.
Communication dated Sep. 26, 2019, issued by the State Intellectual Property Office of P.R. China in counterpart Chinese Application No. 201711022566.4.
Communication dated Oct. 25, 2019, issued by the State Intellectual Property Office of P.R. China in counterpart Chinese Application No. 201711027682.5.
Office Action issued by the EPO dated May 15, 2020 in European Patent Application No. 17198706.8.
Office Action issued by the JPO dated Jun. 2, 2020 in Japanese Patent Application No. 2019-515488.

* cited by examiner

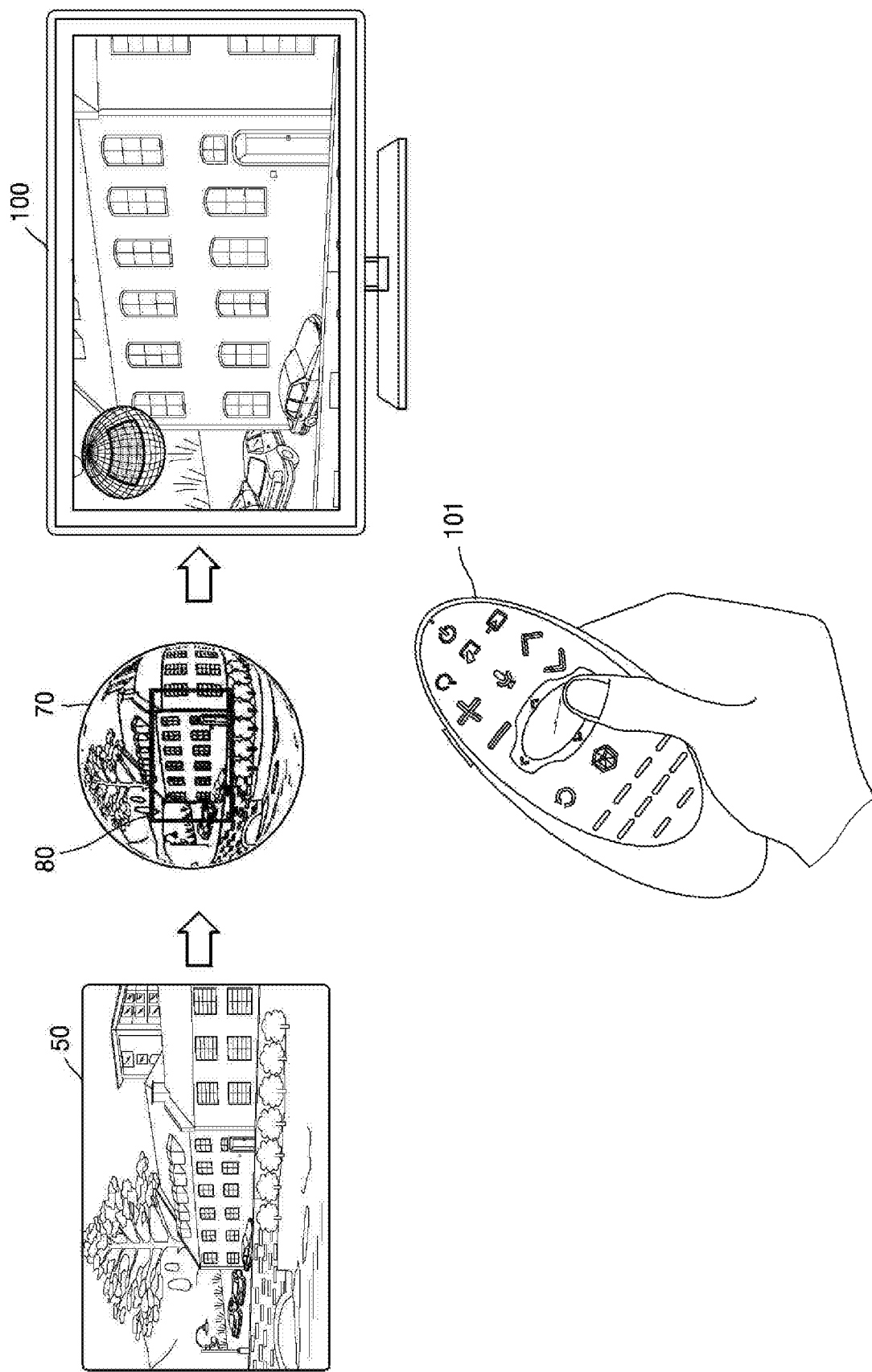

FIG. 5C
| INFORMATION REGARDING CURRENT VIEWPOINT | VALUE |
|---|---|
| HORIZONTAL ANGLE | 0 DEGREES |
| VERTICAL ANGLE | 90 DEGREES |
540
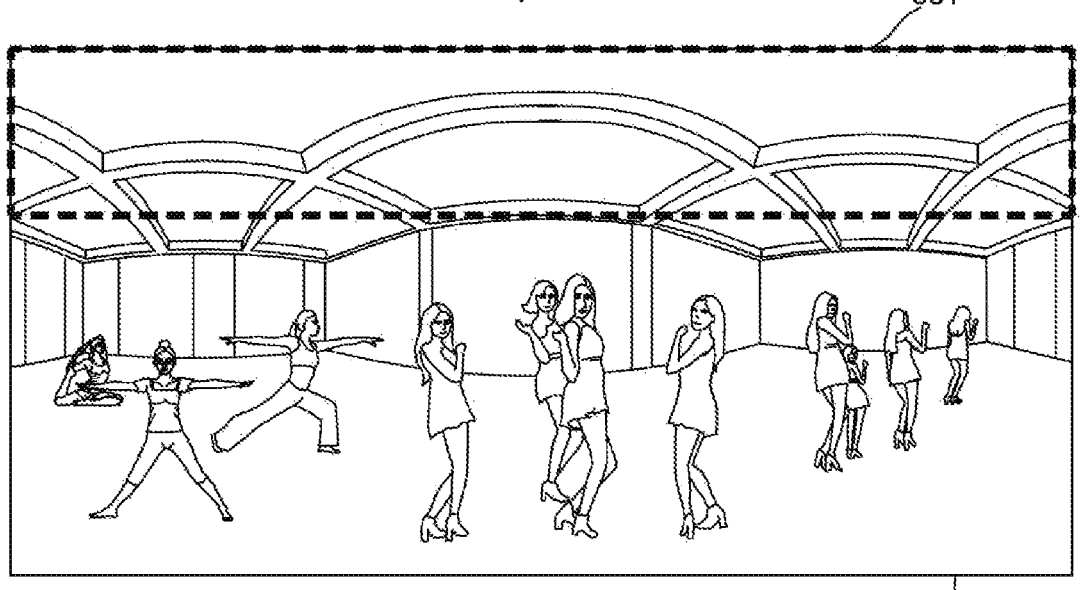

FIG. 6
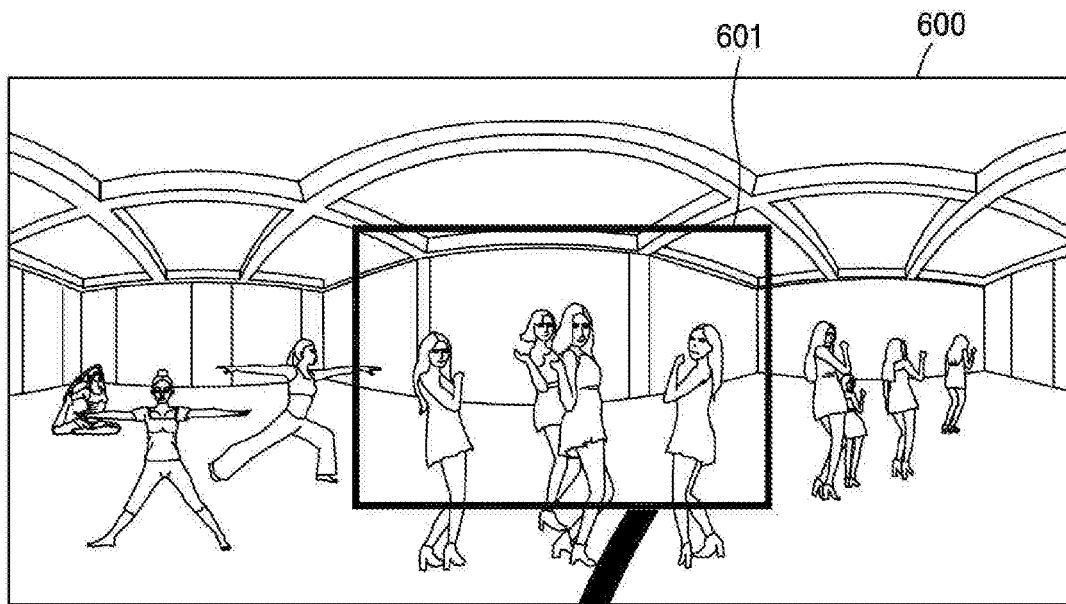
MAP COPY REGION TO SPHERE
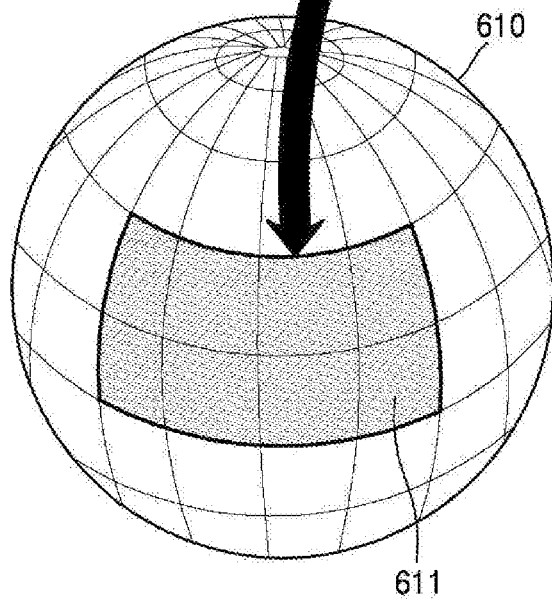

FIG. 7
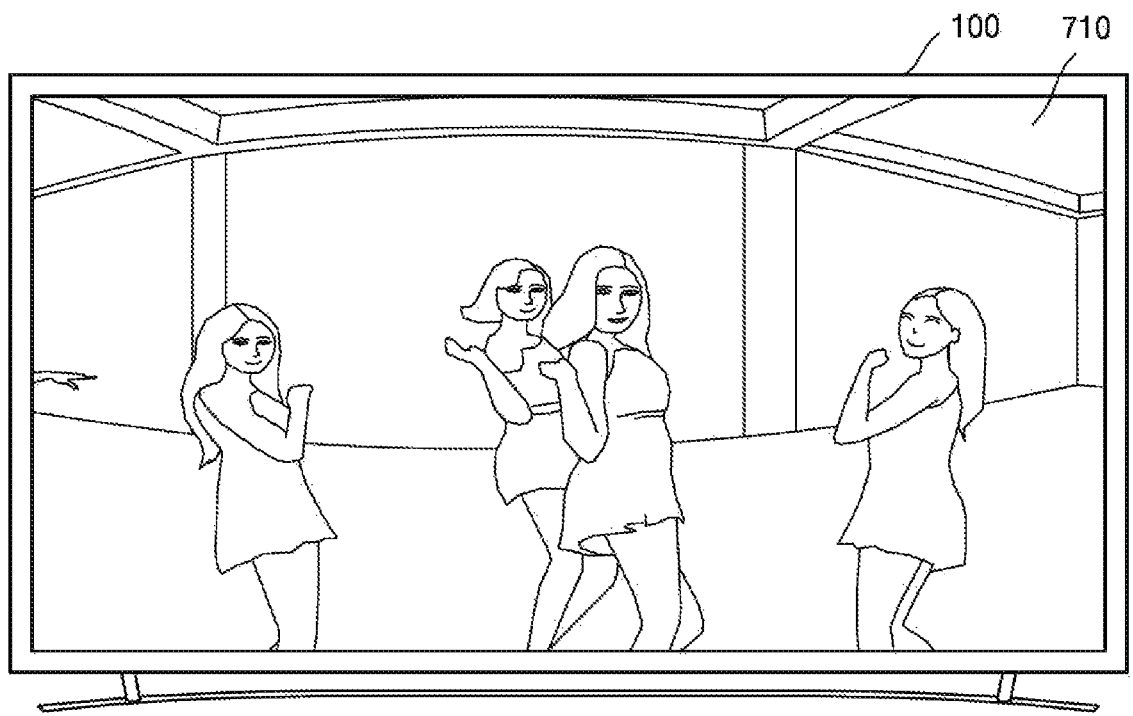
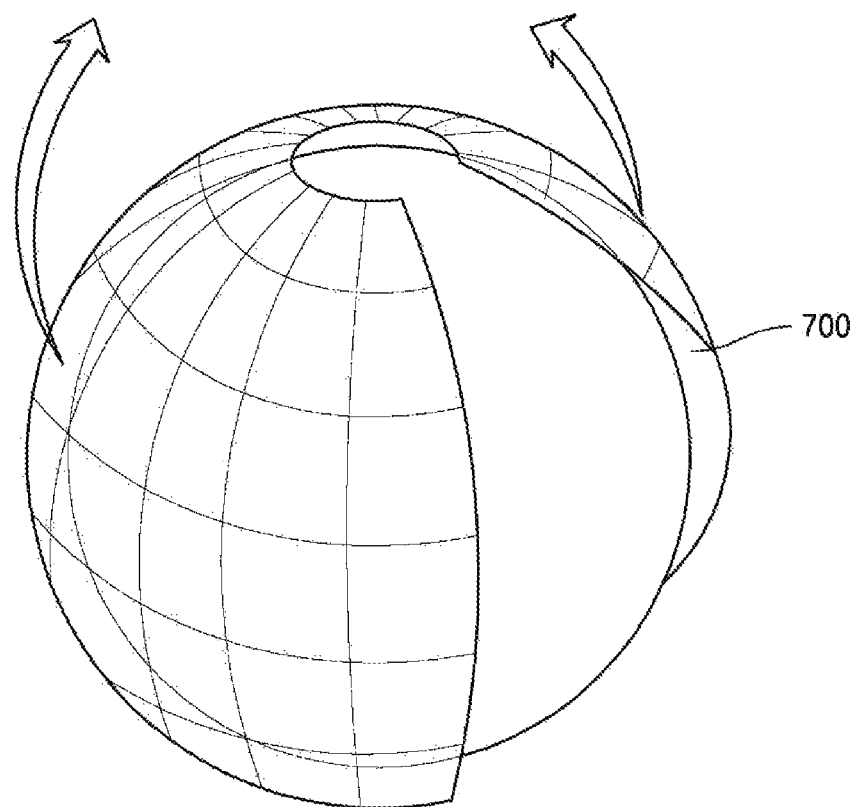

FIG. 8A
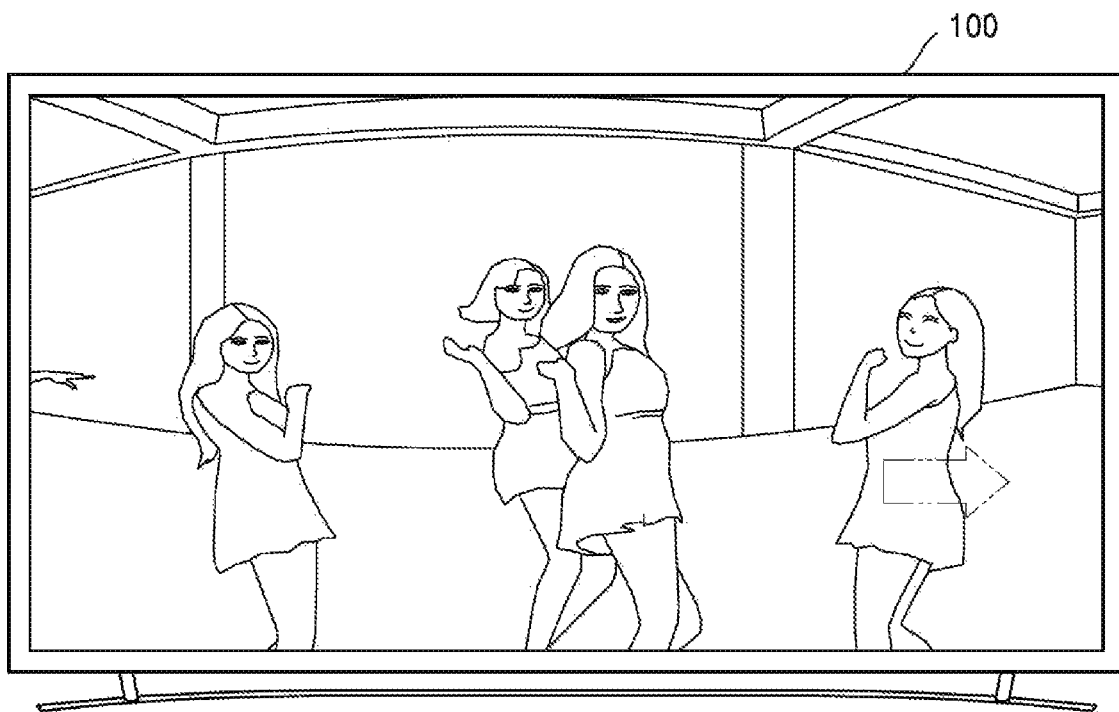
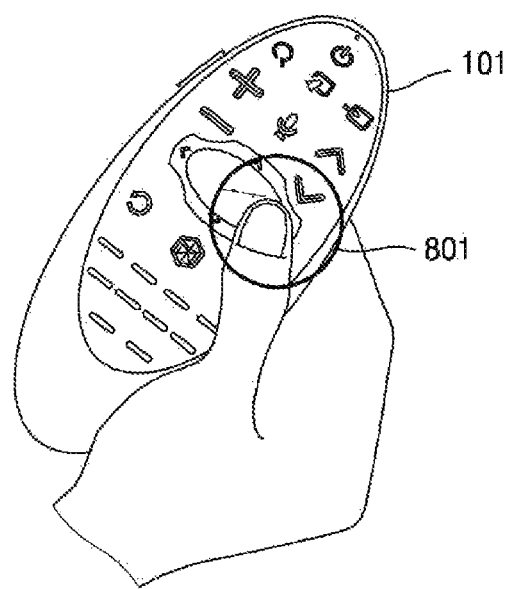

FIG. 8C
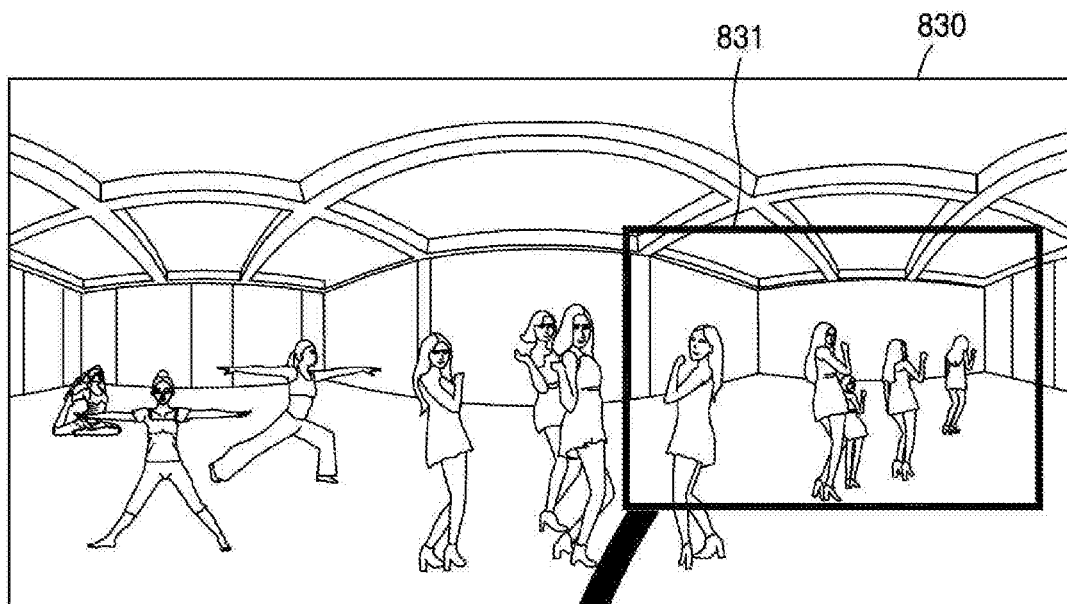
MAP COPY REGION TO SPHERE
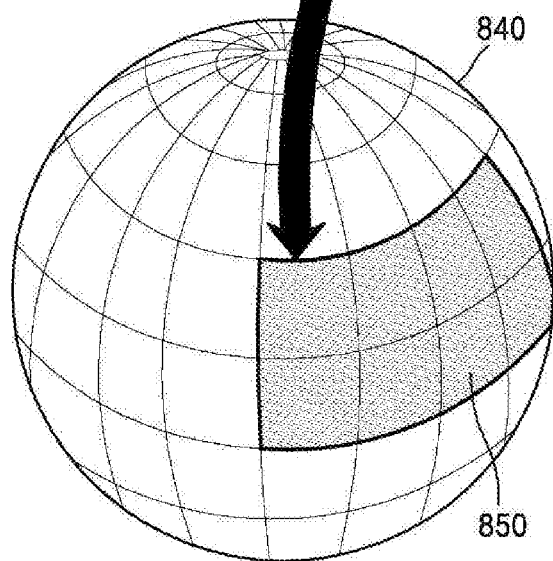

IMAGE DISPLAY APPARATUS AND METHOD OF DISPLAYING IMAGE

CROSS-REFERENCE TO RELATED APPLICATION

This application claims priority from Korean Patent Application No. 10-2016-0141176, filed on Oct. 27, 2016 in the Korean Intellectual Property Office, the disclosure of which is incorporated herein in its entirety by reference.

BACKGROUND

1. Field

Apparatuses and methods consistent with the present disclosure relates to an image display apparatus and a method of displaying an image, and more particularly, to an image display apparatus and a method of displaying a 360-degree image.

2. Description of the Related Art

An image display apparatus displays an image that a user may view. The user may view broadcasts through the image display apparatus. An image display apparatus displays a broadcast selected by the user from among broadcast signals transmitted from broadcast stations. Recently, broadcasting has been converted from analog broadcasting into digital broadcasting all over the world.

In digital broadcasting, digital images and voice signals are transmitted. In comparison with analog broadcasting, little data is lost in digital broadcasting as it has excellent characteristics in terms of high resistance to external noise, robust error correction, high resolution, and provision of a clear screen. In addition, digital broadcasting provides a bidirectional service unlike in the case of analog broadcasting.

Smart televisions (TVs) provide various types of content in addition to a digital broadcasting function have been recently provided, and image display apparatuses capable of displaying 360-degree images have also been provided. A user may view a 360-degree image at different angles by moving viewpoints. Accordingly, a method of allowing the user to quickly and conveniently view a 360-degree image at different angles is desired.

SUMMARY

Additional aspects will be set forth in part in the description which follows and, in part, will be apparent from the description, or may be learned by practice of the presented embodiments.

According to an aspect of an example embodiment, an image display apparatus includes: a display; a graphics processing unit (GPU); and a processor configured to: determine a copy region of a planar-format image based on information regarding a current viewpoint, control the GPU to generate a sphere-format image by mapping an image corresponding to the copy region to a sphere and to generate an output image by rendering the sphere-format image, and control the display to display the output image.

The sphere-format image may comprise a sphere-format 360-degree image and the planar-format image may comprise a planar-format 360-degree image.

The processor may be further configured to: change the information regarding the current viewpoint in response to an input for changing a viewpoint, and change the copy region based on the changed information regarding the current viewpoint.

The information regarding the current viewpoint may include at least one of a horizontal angle, a vertical angle, an angle of view, and a distance from a central point of the sphere.

The processor may be further configured to set a size of the copy region to be greater than a size of a region corresponding to the output image.

In response to the planar-format image being an image corresponding to a first frame of video, the processor may be further configured to determine the copy region based on information regarding a preset viewpoint.

The information regarding the preset viewpoint may vary according to at least one of a user input and an internal setting of the image display apparatus.

The processor may be further configured to: provide, to the GPU, the image corresponding to the copy region, and control the GPU to generate the sphere-format image by mapping the image corresponding to the copy region to the sphere.

The image display apparatus may further include a decoder configured to generate the planar-format image by decoding a image received from an external source.

The processor may be further configured to determine at least one of a shape and a size of the copy region according to the information regarding the current viewpoint.

According to an aspect of another example embodiment, a method of displaying a image, includes: determining a copy region of a planar-format image based on information regarding a current viewpoint; generating a sphere-format image by mapping an image corresponding to the copy region to a sphere; generating an output image by rendering the sphere-format image; and displaying the output image.

The method may further include: changing the information regarding the current viewpoint in response to an input for changing a viewpoint; and changing the copy region based on the changed information regarding the current viewpoint.

The information regarding the current viewpoint may include at least one of a horizontal angle, a vertical angle, an angle of view, and a distance from a central point of the sphere.

The method may further include setting a size of the copy region to be greater than a size of a region corresponding to the output image.

The method may further include, in response to the planar-format image being an image corresponding to a first frame of video, determining the copy region based on information regarding a preset viewpoint.

The information regarding the preset viewpoint may vary according to a user input or an internal setting of an image display apparatus.

The method may further include: providing the image corresponding to the copy region to a graphics processing unit (GPU); and generating, by the GPU, the sphere-format image by mapping the image corresponding to the copy region to the sphere.

The method may further include generating the planar-format image by decoding a image received from an external source.

At least one of a shape and a size of the copy region may be determined according to the information regarding the current viewpoint.

The sphere-format image may comprise a sphere-format 360-degree image and the planar-format image may comprise a planar-format 360-degree image.

BRIEF DESCRIPTION OF THE DRAWINGS

The above and/or other aspects will become apparent and more readily appreciated from the following description of example embodiments, taken in conjunction with the accompanying drawings in which:

FIG. 1 illustrates an image display apparatus for displaying a 360-degree image, according to an example embodiment;

FIGS. 5A, 5B, and 5C are diagrams for explaining a method of determining a copy region, according to an example embodiment;

FIG. 6 is a diagram for explaining a method of generating a sphere-format 360-degree image, according to an example embodiment;

FIG. 7 is a diagram for explaining a method of generating an output image by rendering a sphere-format 360-degree image, according to an example embodiment;

FIGS. 8A, 8B, and 8C are diagrams for explaining cases where viewpoints are changed, according to an example embodiment;

DETAILED DESCRIPTION

Figure 2A:
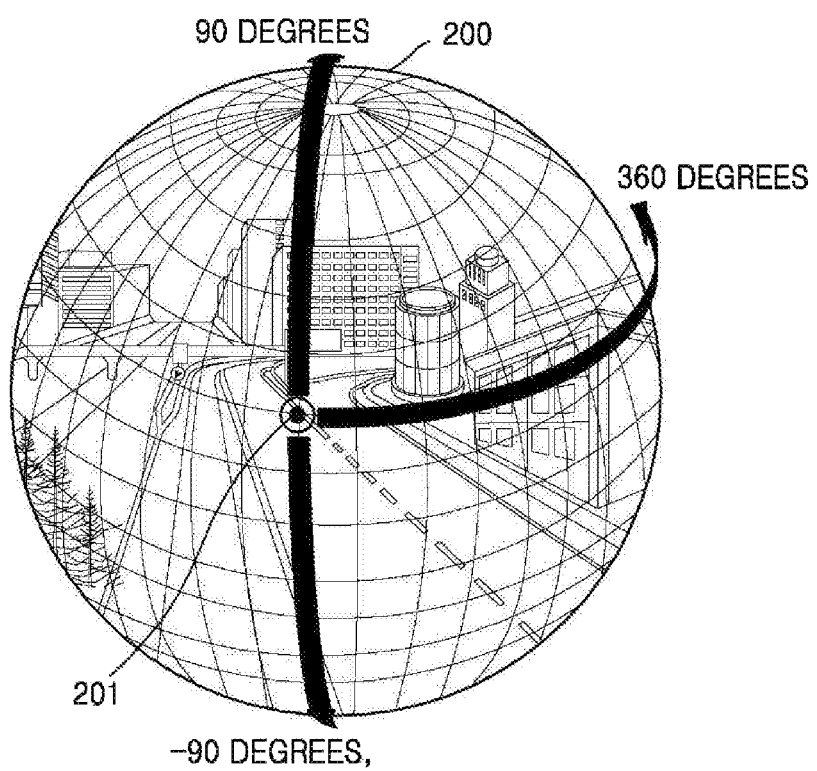
FIGS. 2A, 2B, and 2C are diagrams for explaining information regarding viewpoints, according to an example embodiment.

Example embodiments will now be described more fully with reference to the accompanying drawings. The present disclosure may, however, be embodied in many different forms and should not be construed as being limited to the example embodiments set forth herein; rather, these example embodiments are provided so that this present disclosure will be thorough and complete, and will fully convey the concept of the present disclosure to those of ordinary skill in the art. In the drawings, portions that are not relevant to the descriptions of the present disclosure are omitted, and like reference numerals denote like elements.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the present disclosure.

The terms used in the present specification are merely used to describe particular example embodiments, and are not intended to limit the present disclosure. An expression used in the singular encompasses the expression of the plural, unless it has a clearly different meaning in the context. It will be understood that when a component, such as a layer, a film, a region, or a plate, is referred to as being "connected to" another component, the component can be "directly connected to" the other component or "electrically connected to" the other component with an intervening component therebetween. Also, throughout the specification, when a portion "includes" an element, another element may be further included, rather than excluding the existence of the other element, unless otherwise described.

The use of the terms "a" and "an" and "the" and similar referents in the context of describing the present disclosure are to be construed to cover both the singular and the plural. Also, the steps of all methods described herein can be performed in any suitable order unless otherwise indicated herein or otherwise clearly contradicted by context. Embodiments are not limited to the described order of the steps.

The expressions such as "in some example embodiments" and "in one example embodiment" do not necessarily indicate the same embodiment.

The present disclosure may be described in terms of functional block components and various processing steps. Such functional blocks may be realized by any number of hardware and/or software components configured to perform the specified functions. For example, the functional blocks may be realized by at least one microprocessor or circuit components configured to perform certain functions. Also, for example, the functional blocks may be implemented with any programming or scripting language. Functional blocks may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail with reference to the attached drawings.

FIG. 1 illustrates an image display apparatus 100 for displaying a 360-degree image, according to an example embodiment.

Referring to FIG. 1, the image display apparatus 100 according to an example embodiment may be a television (TV), but is not limited thereto. The image display apparatus 100 may be an electronic apparatus including a display. For example, the image display apparatus 100 may be an electronic apparatus such as a mobile phone, a tablet personal computer (PC), a digital camera, a camcorder, a laptop computer, a desktop computer, an e-book reader, a digital broadcasting terminal, a personal digital assistant (PDA), a portable multimedia player (PMP), a navigation device, an MP3 player, or a wearable device. In addition, the image display apparatus 100 may be a fixed type or a portable type and may be a digital broadcasting receiver that may receive a digital broadcast.

The image display apparatus 100 may be a planar-format image display apparatus, a curved image display apparatus having curvature, or a flexible image display apparatus having adjustable curvature. A resolution of the image display apparatus 100 may be, for example, high definition (HD), full HD, ultra HD, or a resolution greater than ultra HD.

The image display apparatus 100 may be controlled by a control device 101, and the control device 101 may be realized as a device, for example, a remote control or a mobile phone, which controls the image display apparatus 100. When a display of the image display apparatus 100 is a touch screen, the control device 101 may be replaced with a finger of a user, an input pen, or the like.

The control device 101 may control the image display apparatus 100 through short-distance communication including infrared communication or Bluetooth. The control device 101 may control functions of the image display apparatus 100 by using at least one of a key (including a button), a touchpad, a microphone capable of receiving voices of the user, and a sensor capable of detecting motions of the control device 101.

The control device 101 may include on/off buttons for turning on/off the image display apparatus 100. Also, according to user inputs, the control device 101 may change channels, adjust the volume, select a terrestrial broadcast/ cable broadcast/satellite broadcast, or perform an environment setting of the image display apparatus 100. Also, the control device 101 may be a pointing device. For example, the control device 101 may operate as a pointing device when a certain key input is received.

In one or more example embodiments, the term "user" denotes a person who controls functions or operations of the image display apparatus 100 by using the control device 101, and may include a viewer, an administrator, or an installation engineer.

The image display apparatus 100 according to one or more example embodiments may display a 360-degree image.

A 360-degree image may be an image having a 360-degree angle of view. For example, the 360-degree image may be generated based on images that are captured in 360 degrees by at least one camera. In this case, the captured images may be mapped to a sphere, and contact points on the mapped images are stitched, thereby generating a sphere-format 360-degree image. Also, as illustrated in FIG. 1, the sphere-format 360-degree image may be converted into a planar-format 360-degree image 50 such that the planar-format 360-degree image 50 may be transmitted to or stored in another apparatus.

The image display apparatus 100 according to an example embodiment may perform graphic processing on the planar-format 360-degree image 50 such that the planar-format 360-degree image 50 may be converted into a sphere-format 360-degree image 70. For example, the image display apparatus 100 may generate the sphere-format 360-degree image 70 by mapping the planar-format 360-degree image 50 to a sphere.

The image display apparatus 100 according to an example embodiment may select a certain portion 80 of the sphere-format 360-degree image 70 that corresponds to a current viewpoint and may generate an output image corresponding to the selected portion 80. In addition, the image display apparatus 100 may display the generated output image.

A viewpoint may denote a point on a 360-degree image which is viewed by a user. For example, when it is assumed that the user is at a central point of a sphere, the viewpoint may be a point on a 360-degree image that is viewed by the user, wherein the 360-degree image is mapped to a surface of the sphere. However, the viewpoint is not limited thereto. The viewpoint may be indicated by using at least one of a horizontal angle, a vertical angle, an angle of view, and a distance from the central point of the sphere. The horizontal angle, the vertical angle, the angle of view, and the distance from the central point of the sphere will be described later with reference to FIGS. 2A, 2B, and 2C.

A process of converting the planar-format 360-degree image 50 into the sphere-format 360-degree image 70 may be performed by a graphics processing unit (GPU) of the image display apparatus 100. The planar-format 360-degree image 50 needs to be transmitted to the GPU so that the GPU may convert the planar-format 360-degree image 50 into the sphere-format 360-degree image 70. In this case, since the planar-format 360-degree image 50 usually has high resolution, a size of the planar-format 360-degree image 50 may vary. Thus, it may take a lot of time to transmit the entire planar-format 360-degree image 50 to the GPU.

In one or more example embodiments, images corresponding to some portions of the planar-format 360-degree image 50 that are determined based on information regarding a current viewpoint may be transmitted to the GPU. Accordingly, an amount of time taken to transmit the planar-format 360-degree image 50 to the GPU may be reduced.

In addition, in one or more example embodiments, based on the transmitted images corresponding to the portions of the planar-format 360-degree image 50, the sphere-format 360-degree image 70 and an output image may be generated. Thus, compared with a case where the entire planar-format 360-degree image 50 is transmitted to the GPU, an amount of time taken to generate the sphere-format 360-degree image 70 and the output image may be reduced.

Figure 2B:
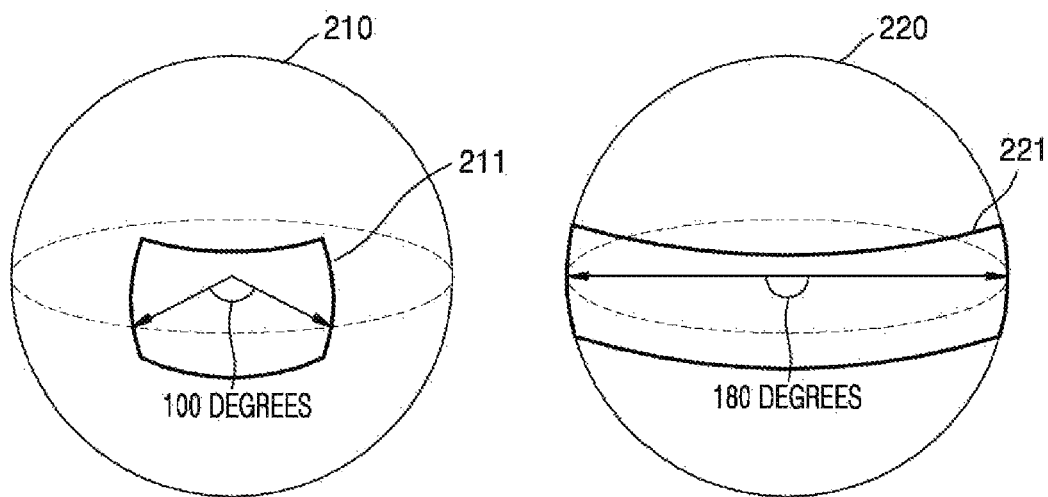
Figure 2C:
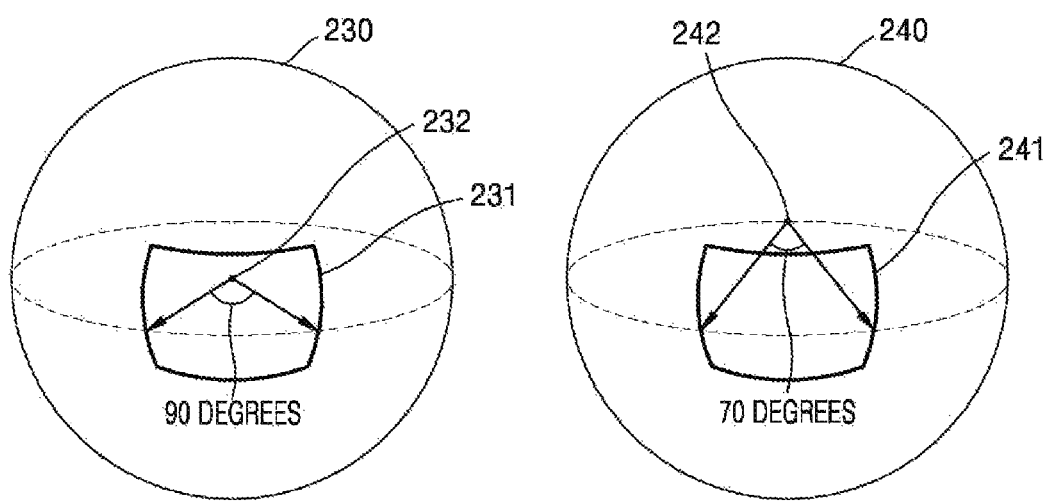

FIGS. 2A, 2B and 2C are diagrams for explaining information regarding viewpoints, according to an example embodiment.

As described above, a 360-degree image may be an image generated based on images captured in 360 degrees by using at least one camera. The captured images may be mapped to the sphere, and contact points on the mapped images are stitched, thereby generating a sphere-format 360-degree image. The image display apparatus 100 may display an image corresponding to a current viewpoint of the sphere-format 360-degree image.

The viewpoint may denote a point on the sphere-format 360-degree image that is viewed by the user. The viewpoint may be indicated by using at least one of a horizontal angle, a vertical angle, an angle of view, and a distance from the central point of the sphere. Thus, information regarding the current viewpoint may be information indicating a point on the 360-degree image, which is currently viewed by the user, as at least one of the horizontal angle, the vertical angle, the angle of view, and the distance from the central point of the sphere.

The horizontal angle may be an angle formed by rotating along the surface of the sphere with respect to a first plane that passes through the central point of the sphere and is parallel to an xy plane. For example, referring to FIG. 2A, in a sphere-format image 200, a certain point 201 on the surface of the sphere may have a horizontal angle of 0 degrees. In this case, the horizontal degree may be between 0 and 360 degrees with respect to the first plane.

The vertical angle may be an angle formed by rotating along the surface of the sphere with respect to a second plane that passes through the central point of the sphere and is parallel to a yz plane. For example, referring to FIG. 2A, in the sphere-format image 200, the certain point 201 on the surface of the sphere may have a vertical angle of 0 degrees. In this case, the vertical angle may be between −90 degrees and 90 degrees with respect to the second plane. Alternatively, according to example embodiments, the vertical angle may be between 0 degrees and 180 degrees with respect to the second plane, but is not limited thereto.

The angle of view may be an angular range indicating an area of the 360-degree sphere-format image that is displayed by the image display apparatus 100 and may be between 0 degrees and 360 degrees.

For example, referring to a sphere-format image 210 on the left side of FIG. 2B, when a first region 211 of the sphere-format image 210 is displayed on the display of the image display apparatus 100, an angle of view of the first region 211 may be 100 degrees. As another example, referring to a sphere-format image 220 on the right side of FIG. 2B, when a second region 221 of the sphere-format image 220 is displayed on the display of the image display apparatus 100, an angle of view of the second region 221 may be 180 degrees. In this case, the angles of view of the first region 211 and the second region 221 of FIG. 2B may be determined based on the central point of the sphere. However, the angles of view are not limited thereto.

The angle of view may differ depending on the distance from the central point of the sphere.

For example, referring to sphere-format images 230 and 240 of FIG. 2C, when regions 231 and 241 displayed on the display are identical to each other, an angle of view, which is determined based on a first point 232 that is the central point of the sphere, may be 90 degrees, and an angle of view determined based on a second point 242 may be 70 degrees. As a distance from the central point of the sphere increases, the angle of view may decrease.

For example, when it is assumed that a diameter of a sphere is 1, a distance from a central point of the sphere may be between 0 and 0.5. For example, as illustrated on the left side of FIG. 2C, when the angle of view is determined based on the first point 232 that is the central point of the sphere, the distance from the central point of the sphere may be 0. Alternatively, as illustrated on the right side of FIG. 2C, when the angle of view is determined based on the second point 242, the distance from the central point may be 0.5. However, the distance from the central point of the sphere may differ according to example embodiments and is not limited to the above examples.

Figure 3:
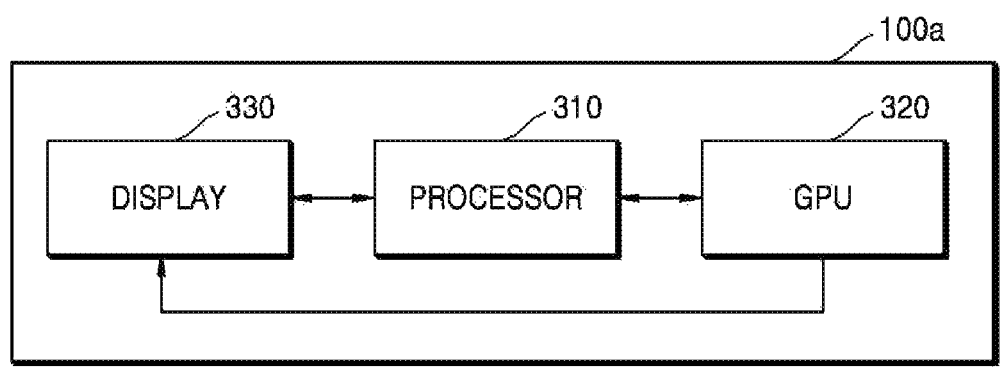
FIG. 3 is a block diagram of a structure of an image display apparatus according to an example embodiment.

FIG. 3 is a block diagram of a structure of an image display apparatus 100a according to an example embodiment.

The image display apparatus 100a of FIG. 3 may be an example embodiment of the image display apparatus 100 of FIG. 1. Referring to FIG. 3, the image display apparatus 100a may include a processor 310, a GPU 320, and a display 330. However, the image display apparatus 100a may include more components than the components illustrated in FIG. 3. However, the embodiments are not limited thereto.

Hereinafter, the above-stated components will be sequentially described.

The processor 310 determines a copy region on a planar-format image based on information regarding a current viewpoint. The planar-format image may be a planar-format 360-degree image.

The copy region may be a region of the planar-format 360-degree image that is transmitted to the GPU 320 for graphic processing. At least one of a shape and a size of the copy region may differ depending on the information regarding the current viewpoint.

The processor 310 may determine the copy region based on the information regarding the current viewpoint that includes at least one of the horizontal angle, the vertical angle, the angle of view, and the distance from the central point of the sphere. For example, the processor 310 may determine a region displayed on the display 330 in advance based on the information regarding the current viewpoint. Also, the processor 310 may determine the copy region from the region displayed on the display 330. For example, the processor 310 may determine, as the copy region, a region having a size that is greater by a certain ratio than a size of the region displayed on the display 330. Alternatively, according to example embodiments, the processor 310 may determine, as the copy region, a region identical to the region displayed on the display 330. However, the copy region is not limited thereto.

When the planar-format 360-degree image is a first frame of a 360-degree video, the processor 310 may determine the copy region based on information regarding a preset viewpoint. In this case, the information regarding the preset viewpoint may differ according to a user input and/or internal settings of the image display apparatus 100a.

The processor 310 may change the information regarding the current viewpoint in response to an input for changing a viewpoint. The processor 310 may change the copy region based on information regarding a changed current viewpoint.

The processor 310 may transmit, to the GPU 320, an image corresponding to the copy region. For example, the processor 310 may copy, to a memory, an image corresponding to the copy region from the planar-format 360-degree image and may transmit the copied image to the GPU 320.

The processor 310 may transmit, to the GPU 320, the image corresponding to the copy region instead of the entire planar-format 360-degree image, and thus an amount of data transmitted to the GPU 320 may decrease. Accordingly, an amount of time taken to transmit the planar-format 360-degree image to the GPU 320 may decrease. Also, an amount of time taken for the GPU 320 to generate a 360-degree sphere-format image may decrease.

The processor 310 may be embodied as various combinations of at least one memory and at least one processor. For example, the memory may generate or delete a program module according to an operation of the processor 310, and the processor 310 may process operations of the program module.

The processor 310 may execute one or more instructions stored in the memory to determine the copy region from the planar-format 360-degree image based on the information regarding the current viewpoint. Also, the processor 310 may execute one or more instructions stored in the memory to generate a sphere-format 360-degree image by mapping the image corresponding to the copy region to the sphere. The processor 310 may control the GPU 320 such that the GPU 320 may generate an output image by rendering the sphere-format 360-degree image. In addition, the processor 310 may execute one or more instructions stored in the memory to control the display 330 to display the output image.

The GPU 320 may generate a sphere-format image by mapping the image corresponding to the copy region to the sphere. The sphere-format image may be a sphere-format 360-degree image. The GPU 320 may generate the output image by rendering the sphere-format 360-degree image.

The GPU 320 may generate the sphere-format 360-degree image by mapping, to the sphere, the image corresponding to the copy region instead of mapping the entire planar-format 360-degree image. Thus, an amount of data used during a graphic processing process may be reduced in comparison with a case where the sphere-format 360-degree image is generated by using the entire planar-format 360- degree image. Accordingly, an amount of time taken for the GPU 320 to generate the sphere-format 360-degree image may be reduced.

The display 330 may display the output image generated by the GPU 320.

For example, the display 330 may display an image of a 360-degree image that corresponds to the current viewpoint. Also, the display 330 may display a changed output image in response to an input for changing the current viewpoint.

When the display 330 is a touch screen, the display 330 may be used as an input device in addition to an output device. The display 330 may include at least one of a liquid crystal display, a thin film transistor-liquid crystal display, an organic light-emitting diode display, a flexible display, a three-dimensional (3D) display, and an electrophoretic display.

Also, according to an implementation type of the image display apparatus 100a, the image display apparatus 100a may include two or more displays 330.

FIG. 3 illustrates that the GPU 320 is separated from the processor 310. However, embodiments are not limited to this illustration. According to example embodiments, the processor 310 may include the GPU 320.

Figure 4:
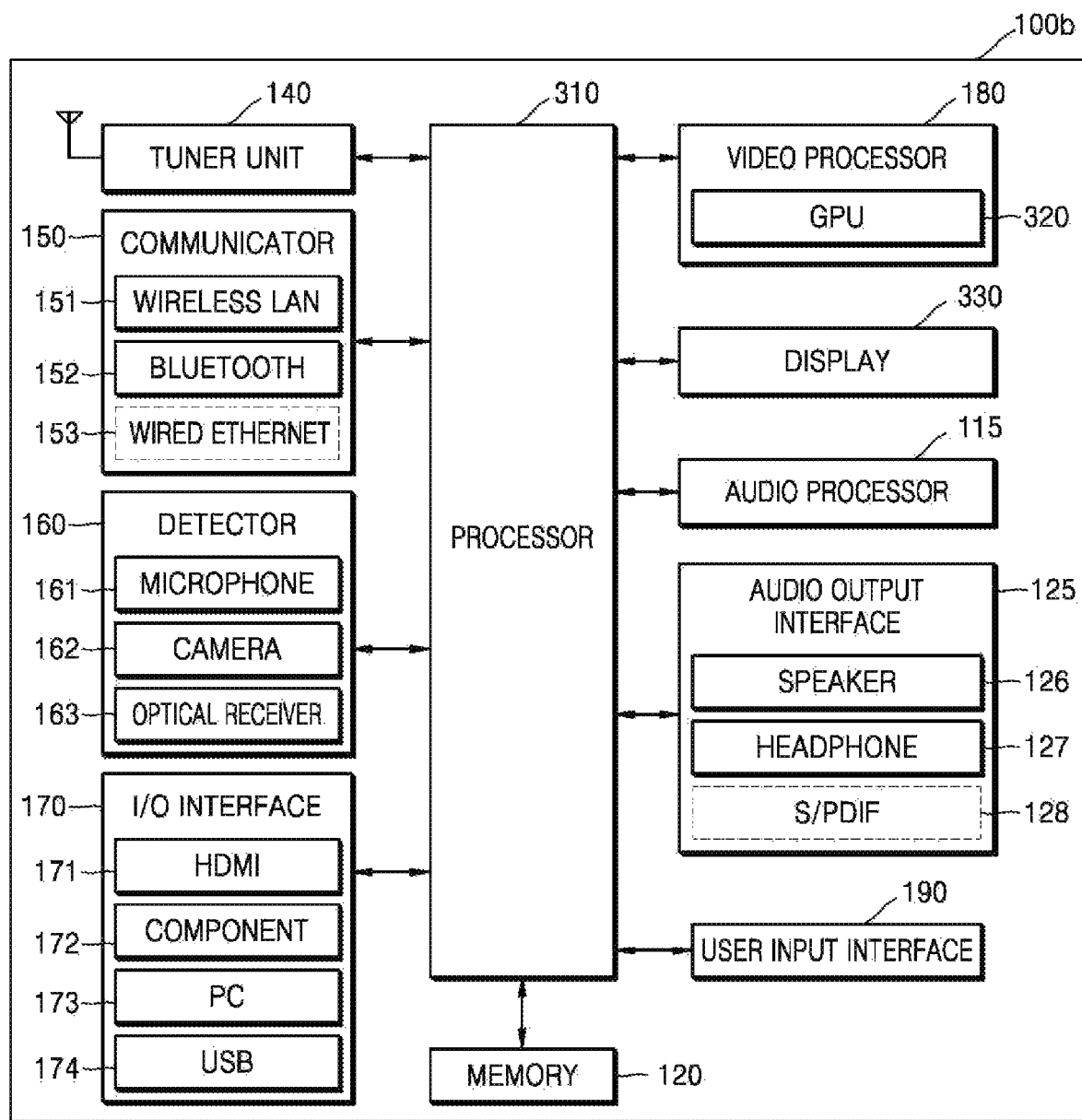
FIG. 4 is a block diagram of a structure of an image display apparatus according to another example embodiment.

FIG. 4 is a block diagram of a structure of an image display apparatus 100b according to another example embodiment.

As illustrated in FIG. 4, the image display apparatus 100b may further include a tuner unit 140, a communicator 150, a detector 160, an input/output (I/O) interface 170, a video processor 180, an audio processor 115, an audio output interface 125, a user input interface 190, and a memory 120, in addition to the processor 310, the GPU 320, and the display 330.

The descriptions of the processor 310, the GPU 320, and the display 330 are provided with reference to FIG. 3 and thus will not be repeated.

The display 330 may display, on a screen, video included in broadcast signals received through the tuner unit 140 according to control of the processor 310. Also, the display 330 may display content (e.g., video) that is input through the communicator 150 or the I/O interface 170. The display 330 may output an image stored in the memory 120 according to the control of the processor 310. In addition, the display 330 may display a voice user interface (UI) (e.g., a voice UI including a voice instruction guide) for performing a voice recognition task corresponding to voice recognition, or a motion UI (e.g., a motion UI including a user motion guide for motion recognition) for performing a motion recognition task corresponding to motion recognition.

The audio processor 115 processes audio data. The audio processor 115 may perform, on the audio data, various processes such as decoding, amplification, and noise filtering. The audio processor 115 may include audio processing modules for processing audios corresponding to multiple pieces of content.

The audio output interface 125 outputs audio included in a broadcast signal received through the tuner unit 140 according to the control of the processor 310. The audio output interface 125 may output audio (e.g., voice, sounds, etc.) that is input through the communicator 150 or the I/O interface 170. Also, the audio output interface 125 may output audio stored in the memory 120 according to the control of the processor 310. The audio output interface 125 may include at least one of a speaker 126, a headphone 127, and a Sony/Philips Digital Interface (S/PDIF) 128. The audio output interface 125 may include a combination of the speaker 126, the headphone 127, and the S/PDIF 128.

The tuner unit 140 may perform tuning with respect to only a frequency of a channel that the image display apparatus 100b desires to receive from among various frequency components through amplification, mixing, resonance, etc. of broadcast signals received in a wired/wireless manner. The broadcast signal includes audio, video, and additional information (e.g., an electronic program guide (EPG)).

The tuner unit 140 may receive the broadcast signal in a frequency band corresponding to a channel number (e.g., a cable broadcast channel #506) according to a user input (e.g., a control signal, for example, a channel number input, an input of pressing an up or down button to select a channel, or a channel input on an EPG screen, which is received from the control device 101).

The tuner unit 140 may receive the broadcast signal from various sources such as a terrestrial broadcast, a cable broadcast, a satellite broadcast, or an Internet broadcast. The tuner unit 140 may receive the broadcast signal from a source such as an analog broadcast or a digital broadcast. The broadcast signal received through the tuner unit 140 may be decoded (e.g., by performing audio decoding, video decoding, and/or additional information decoding) and thus divided into audio, video, and/or additional information. The audio, the video, and/or additional information may be stored in the memory 120 according to the control of the processor 310.

The image display apparatus 100b may include at least one tuner unit 140. The at least one tuner unit 140 may be integrally formed with the image display apparatus 100b or may be embodied as a separate device (e.g., a set-top box, or a tuner unit connected to the I/O interface 170) that includes a tuner unit electrically connected to the image display apparatus 100b.

The communicator 150 may connect the image display apparatus 100b to an external source (e.g., an audio device, etc.) according to the control of the processor 310. The processor 310 may receive/transmit content from/to the external device connected to the image display apparatus 100b through the communicator 150, may download an application from the external source, or may browse web sites. The communicator 150 may include one of a wireless LAN module 151, a Bluetooth module 152, and a wired Ethernet module 153, depending on performance or a structure of the image display apparatus 100b.

Also, the communicator 150 may include a combination of the wireless LAN module 151, the Bluetooth module 152, and the wired Ethernet module 153. The communicator 150 may receive a control signal from the control device 101 according to control of the processor 310. The control signal may be of a Bluetooth signal, a radio frequency (RF) signal, or a Wi-Fi signal.

The communicator 150 may further include a short distance communication module (e.g., near field communication (NFC) module and Bluetooth low energy (BLE) module), in addition to the Bluetooth module 152.

The detector 160 may detect voice, an image, and/or an interaction of the user and may include a microphone 161, a camera 162, and an optical receiver 163.

The microphone 161 receives voice of the user when the user speaks. The microphone 161 may convert the received voice into an electrical signal and may output the electrical signal to the processor 310. The voice of the user may include, for example, voice corresponding to a menu or a function of the image display apparatus 100b.

The camera 162 may receive an image (e.g., continuous frames) corresponding to a motion of the user that includes a gesture within a recognition range of the camera 162. Based on a motion recognition result, the processor 310 may select a menu displayed by the image display apparatus 100*b* or may perform a control operation corresponding to the motion recognition result. For example, the control operation may be a channel adjustment, a volume adjustment, an indicator movement, or a cursor movement.

The optical receiver 163 receives an optical signal (including a control signal) from an external control device through an optical window of a bezel of the display 330, etc. The optical receiver 163 may receive an optical signal corresponding to a user input (e.g., a touch, a press, a touch gesture, a speech, or a motion) from a control device. A control signal may be extracted from the received optical signal according to the control of the processor 310.

The I/O interface 170 receives video (e.g., a moving image, etc.), audio (e.g., voice, music, etc.), additional information (e.g., an EPG, etc.), and the like from a source outside of the image display apparatus 100*b* according to the control of the processor 310. The I/O interface 170 may include one of a High-Definition Multimedia Interface (HDMI) port 171, a component jack 172, a personal computer (PC) port 173, and a universal serial bus (USB) port 174. The I/O interface 170 may include a combination of the HDMI port 171, the component jack 172, the PC port 173, and the USB port 174.

The processor 310 controls operations of the image display apparatus 100*b* and signal flow between the components within the image display apparatus 100*b* and processes data. When there is a user input or a user input satisfies a preset and stored condition, the processor 310 may execute an operation system (OS) or various applications that are stored in the memory 120.

The user input interface 190 is a component by which the user inputs data so as to control the image display apparatus 100*b*. For example, the user input interface 190 may include a key pad, a dome switch, a touch pad (e.g., a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and/or a jog switch, but embodiments are not limited thereto.

The user input may be an input for changing a viewpoint. When the user input interface 190 is a key pad or a dome switch, the user input for changing the viewpoint may be an input of clicking or pressing a key corresponding to a certain direction. Alternatively, when the user input interface 190 is a touch pad, the user input may be an input of touching a key corresponding to a certain direction. However, embodiments are not limited thereto.

With regard to the user input for changing the viewpoint, a degree to which the viewpoint is changed may differ depending on a method of clicking or touching a key. For example, when a key is pressed or touched for at least a certain period of time, viewpoints may be continuously changed. When a key is clicked or pressed for a short period of time, viewpoints may be changed in a unit of a certain angular section. For example, when the user clicks a key corresponding to a rightward direction once, the viewpoint may move rightwards at an interval of 30 degrees.

The user input interface 190 may be a component of the above-described control device 101 or a component of the image display apparatus 100*b*.

The memory 120 may store programs for controlling the image display apparatus 100*b* and may store data that is input to or output from the image display apparatus 100*b*.

The memory 120 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disc, and an optical disc.

The memory 120 may include a module including one or more instructions for determining a copy region from a planar-format 360-degree image based on information regarding a current viewpoint, generating a sphere-format 360-degree image by mapping an image corresponding to the copy region to a sphere, generating an output image by rendering the sphere-format 360-degree image, and displaying the output image.

The block diagrams of the image display apparatuses 100*a* and 100*b* of FIGS. 3 and 4 illustrate example embodiments. Depending on the specifications of actually realized image display apparatuses (e.g., the image display apparatuses 100*a* and 100*b*), some components may be added to or combined with the components illustrated in the block diagrams, or the components illustrated in the block diagrams may be deleted. For example, according to necessity, two or more components may be integrated into one component, or one component may be divided into two or more components. In addition, functions performed by the components are described to explain example embodiments, and specific operations or devices do not limit the scope of the present disclosure.

Figure 5A:
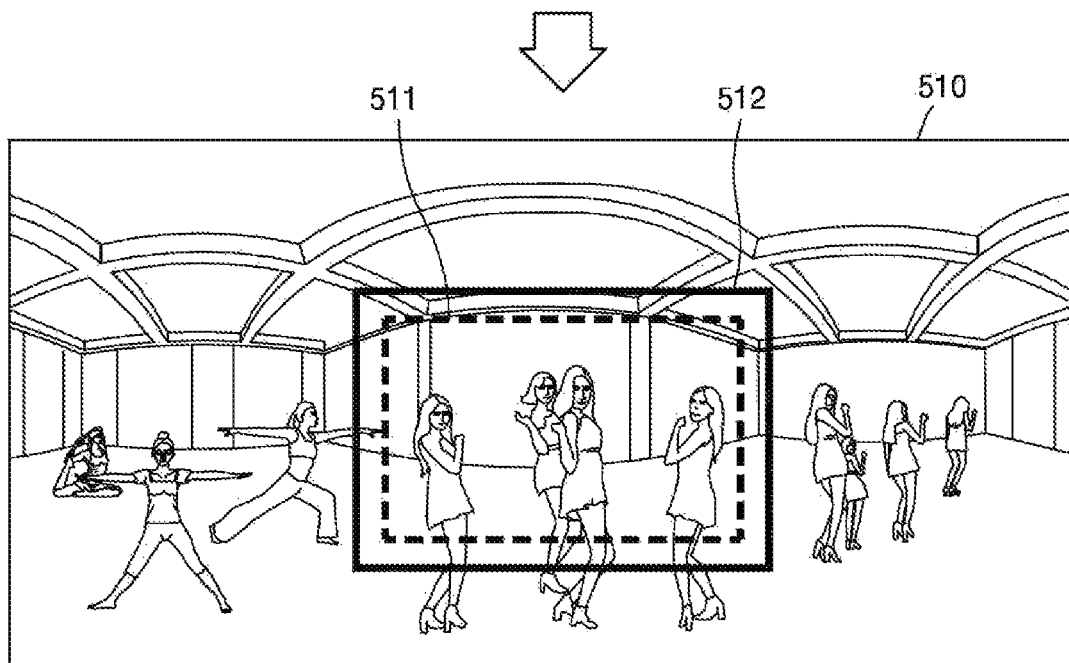
Figure 5B:
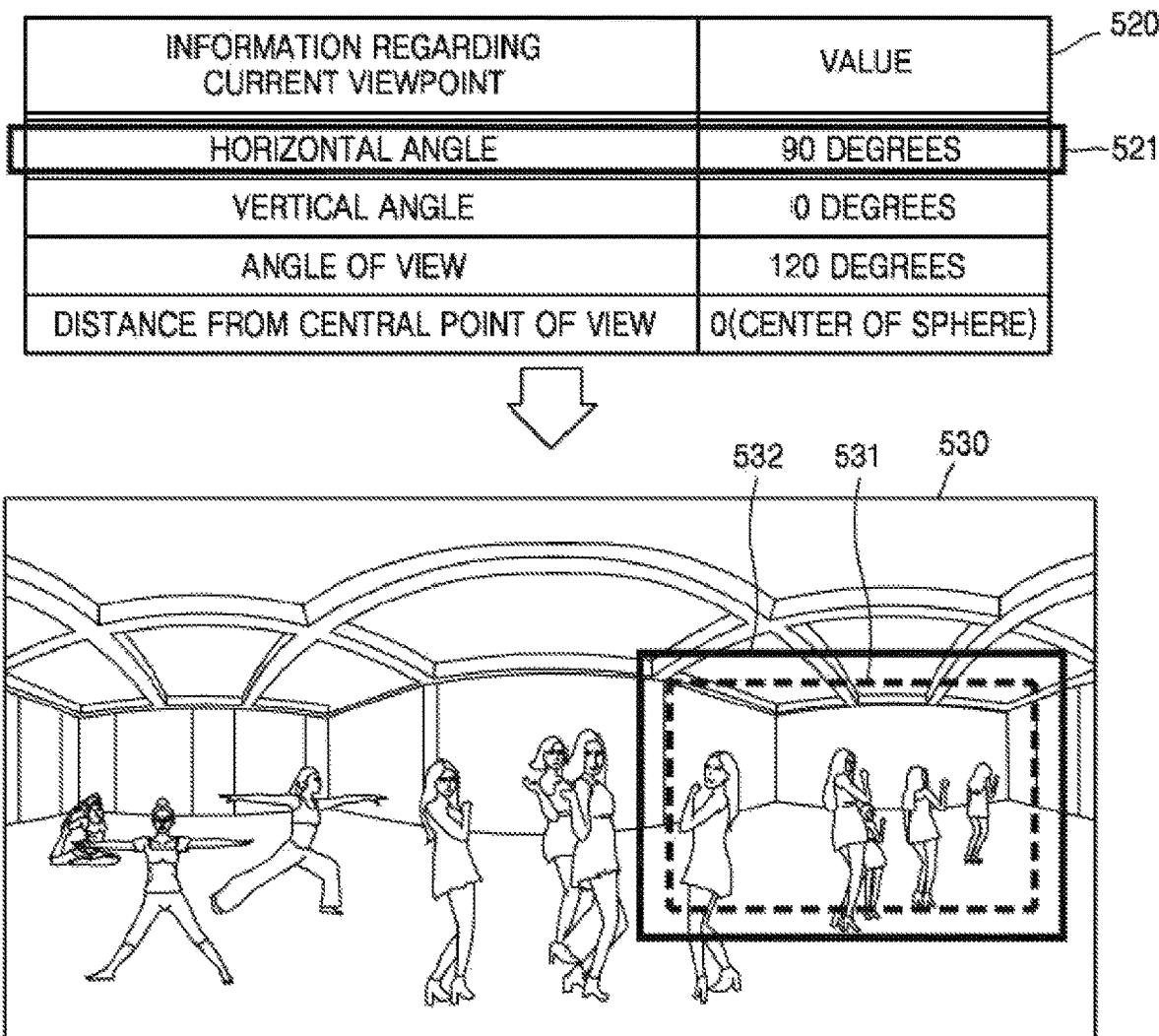

FIGS. 5A, 5B, and 5C are diagrams for explaining a method of determining a copy region, according to an example embodiment.

The image display apparatus 100 may determine the copy region from a planar-format 360-degree image based on information regarding a current viewpoint.

As described above, the copy region may be a region of the planar-format 360-degree image that is to be transmitted to the GPU 320 for graphic processing.

The planar-format 360-degree image may be an image generated by decoding a 360-degree image received via an external source or a network, but is not limited thereto.

The entire 360-degree image is not displayed on the display 330, but an image corresponding to the current viewpoint is displayed on the display 330. For example, referring to FIG. 5A, the image display apparatus 100 may display, on the display 330, an image of a region 511 corresponding to a current viewpoint, wherein the region 511 is part of a planar-format 360-degree image 510.

The image display apparatus 100 may determine a region of the planar-format 360-degree image 510 that is displayed on the display 330 based on the information regarding the current viewpoint, and may determine the copy region from the region displayed on the display 330.

Referring to a table 500 of FIG. 5A, the image display apparatus 100 may indicate the current viewpoint by using a horizontal angle, a vertical angle, an angle of view, and a distance from a central point of a sphere. For example, when the horizontal angle is 0 degrees, the vertical angle is 0 degrees, the angle of view is 120 degrees, and the distance from the central point of the sphere is 0, the image display apparatus 100 may determine, as the region displayed on the display 330, a central region 511 of the planar-format 360-degree image 510.

Also, referring to a table 520 of FIG. 5B, when a horizontal angle is 90 degrees, a vertical angle is 0 degrees, an angle of view is 120 degrees, and a distance from a central point of a sphere is 0, a region 531 of the planar-format 360-degree image 530 displayed on the display 330 may be a region that is moved 90 degrees rightwards from the region 511 illustrated in FIG. 5A.

The image display apparatus 100 may store, as meta information of the planar-format 360-degree image 510, information regarding the horizontal angle, the vertical angle, the angle of view, and the distance from the central point of the sphere. Alternatively, according to an example embodiment, the image display apparatus 100 may store in advance a mapping relationship between the region displayed on the display 330 and the horizontal angle, the vertical angle, the angle of view, and the distance from the central point of the sphere. However, embodiments are not limited thereto. The image display apparatus 100 may determine a region corresponding to the current viewpoint based on a preset mapping relationship or information.

The image display apparatus 100 may determine the copy region as a region identical to the region 511 displayed on the image display apparatus 100. Alternatively, as illustrated in FIG. 5A, the image display apparatus 100 may determine, as the copy region, a region 512 having a size that is greater by a certain ratio than a size of the region 511. When the copy region is determined as the region 512 that is greater by a certain ratio than the region 511 displayed on the display 330, although the image display apparatus 100 does not quickly change a copy region in response to an input for changing a current viewpoint, the image display apparatus 100 may display the 360-degree image without buffering.

As stated above, elements forming the information regarding the current viewpoint may differ according to example embodiments.

For example, referring to FIG. 5C, information 540 regarding the current viewpoint may include only a horizontal angle and a vertical angle. For example, when the horizontal angle is 0 degrees and the vertical angle is 90 degrees, a region displayed on the display 330 may be an upper region 551 of a planar-format 360-degree image 550. In this case, a copy region may be the region 551 identical to the region displayed on the display 330. However, the copy region is not limited thereto.

The image display apparatus 100 may differently determine at least one of a shape and a size of the copy region, depending on the information regarding the current viewpoint. For example, as illustrated in FIGS. 5A to 5C, at least one of shapes and sizes of the copy regions 512 and 532 of FIGS. 5A and 5B may be different from at least one of a shape and a size of the copy region 551 of FIG. 5C, depending on the information regarding the current viewpoint.

FIG. 6 is a diagram for explaining a method of generating a sphere-format 360-degree image, according to an example embodiment.

The image display apparatus 100 may transmit an image corresponding to a copy region to the GPU 320. The GPU 320 may generate a sphere-format 360-degree image by using the transmitted image corresponding to the copy region.

For example, referring to FIG. 6, the image display apparatus 100 may transmit, to the GPU 320, an image corresponding to a copy region 601 of a planar-format 360-degree image 600. Accordingly, the image display apparatus 100 may decrease an amount of data transmitted to the GPU 320.

The GPU 320 may map an image corresponding to a copy region 601 to a sphere 610 and may generate a sphere-format 360-degree image 611. The GPU 320 may generate the sphere-format 360-degree image 611 by using the image corresponding to the copy region 601 instead of a planar-format 360-degree image 600 and may decrease an amount of time taken to generate the sphere-format 360-degree image 611. A process of generating the sphere-format 360-degree image 611 by the GPU 320 is well known to one of ordinary skill in the art and thus will not be described in detail.

FIG. 7 is a diagram for explaining a method of generating an output image by rendering a sphere-format 360-degree image, according to an example embodiment.

Referring to FIG. 7, the GPU 320 may generate an output image 710 by rendering a sphere-format 360-degree image 700.

For example, the GPU 320 may calculate property values such as coordinates, a shape, a size, and a color of each subject according to a layout of a screen, based on the sphere-format 360-degree image 700. The GPU 320 may generate the output image 710 based on the calculated property values. A process of rendering the sphere-format 360-degree image 700 by the GPU 320 is well known to one of ordinary skill in the art and thus will not be described in detail.

The image display apparatus 100 may display the output image 710 generated by the GPU 320.

Figure 8B:
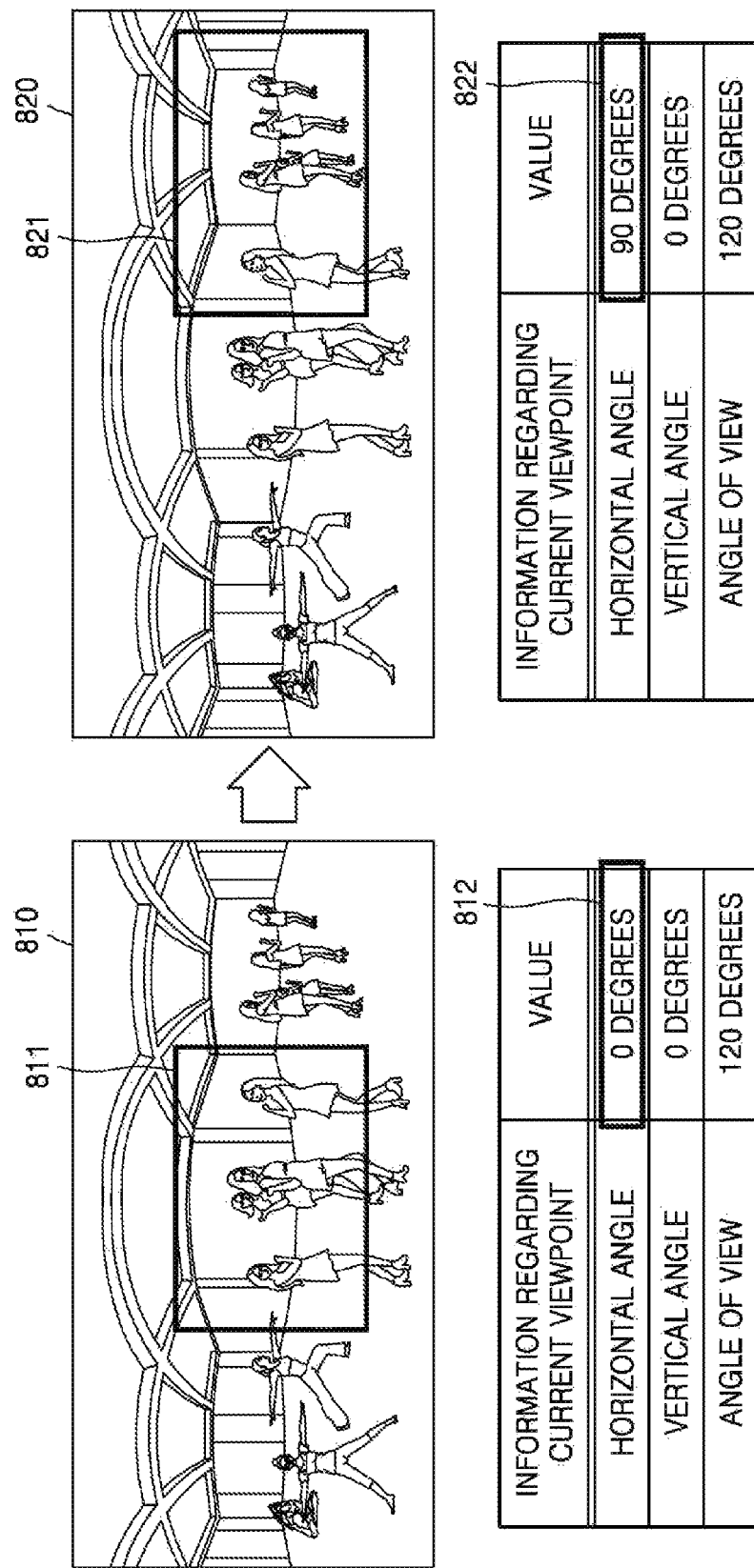

FIGS. 8A, 8B, and 8C are diagrams for explaining cases where current viewpoints are changed, according to an example embodiment.

The image display apparatus 100 according to an example embodiment may change information regarding a current viewpoint in response to an input for changing a current viewpoint.

The current viewpoint may be changed according to a user input of moving, by the control device 101, the current viewpoint in a certain direction and internal instructions of the image display apparatus 100. For example, referring to FIG. 8A, the image display apparatus 100 may receive an input 801 of moving the current viewpoint rightwards by using the control device 101. The input 801 of moving the current viewpoint rightwards may be an input of clicking or touching a rightward key on the control device 101, but is not limited thereto.

The image display apparatus 100 according to an example embodiment may change at least one of properties (e.g., the horizontal angle, the vertical angle, the angle of view, the central point of the sphere, etc.) that form the information regarding the current viewpoint, in response to the user input of moving the current viewpoint in a certain direction. For example, referring to FIG. 8B, the image display apparatus 100 may change a horizontal angle of 0 degrees 812 to 90 degrees 822.

The image display apparatus 100 according to an example embodiment may change a copy region based on information regarding a changed current viewpoint.

For example, referring to FIG. 8B, when the horizontal angle is 0 degrees, the vertical angle is 0 degrees, and the angle of view is 120 degrees, the copy region may be a central region 811 of a planar-format 360-degree image 810. As the horizontal angle included in the information regarding the current viewpoint is changed from 0 degrees to 90 degrees, the copy region may be changed to a right region 821 of a planar-format 360-degree image 820. For example, the copy region may be a region that is moved 90 degrees rightwards compared to a copy region illustrated in the left view of FIG. 8B.

The image display apparatus 100 may transmit an image corresponding to the changed copy region to the GPU 320.

Referring to FIG. 8C, the GPU 320 may map, to a sphere 840, an image corresponding to a changed copy region 831 of a planar-format 360-degree image 830 and may generate a sphere-format 360-degree image 850. Also, the GPU 320 may generate an output image by rendering the generated sphere-format 360-degree image 850.

The image display apparatus 100 may display, on the display 330, the output image generated by the GPU 320.

Figure 9:
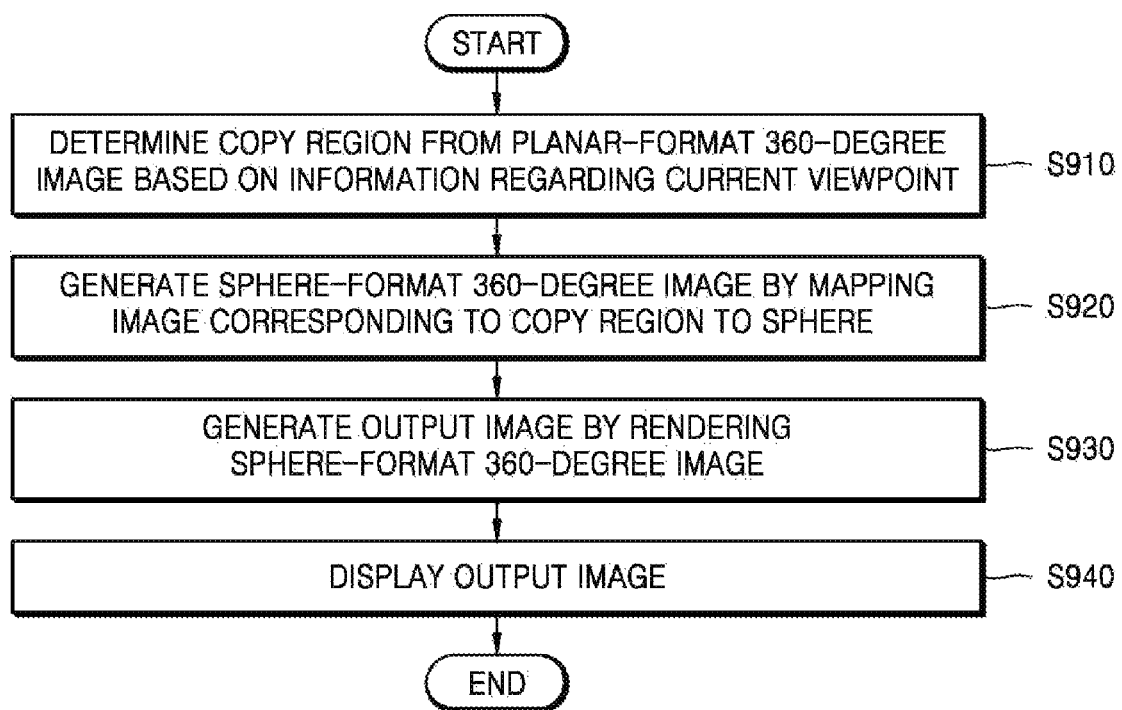
FIG. 9 is a flowchart of a method of displaying an image according to an example embodiment.

FIG. 9 is a flowchart of a method of displaying an image according to an example embodiment.

In operation S910, the image display apparatus 100 determines a copy region of a planar-format 360-degree image based on information regarding a current viewpoint.

As described above, the copy region may be a region of the planar-format 360-degree image that is transmitted to the GPU 320 for graphic processing. The current viewpoint may be indicated by using at least one of a horizontal angle, a vertical angle, an angle of view, and a distance from a central point of a sphere. In addition, the copy region may have a shape and size that differ according to the information regarding the current viewpoint.

The image display apparatus 100 may determine a region displayed on the display 330 based on the information regarding the current viewpoint. The image display apparatus 100 may determine a copy region from the region displayed on the display 330. For example, the processor 310 may determine, as the copy region, a region having a size that is greater by a certain ratio than a size the region displayed on the display 330. Alternatively, according to example embodiments, the processor 310 may determine the copy region as a region identical to the region displayed on the display 330. However, the copy region is not limited thereto.

The image display apparatus 100 according to an example embodiment may determine the copy region based on information regarding a preset viewpoint when the planar-format 360-degree image is a first frame of a 360-degree video. In this case, the information regarding the preset viewpoint may differ according to a user input and/or internal settings of the image display apparatus 100.

The image display apparatus 100 according to an example embodiment may change the information regarding the current viewpoint in response to an input for changing a viewpoint. Moreover, the image display apparatus 100 may change the copy region based on information regarding a changed current viewpoint.

The image display apparatus 100 may transmit an image corresponding to the copy region of the planar-format 360-degree image, to the GPU 320.

In operation S920, the image display apparatus 100 may generate a sphere-format 360-degree image by mapping the image corresponding to the copy region to a sphere.

In operation S930, the image display apparatus 100 may generate an output image by rendering the sphere-format 360-degree image.

In operation S940, the image display apparatus 100 displays the output image.

Figure 10:
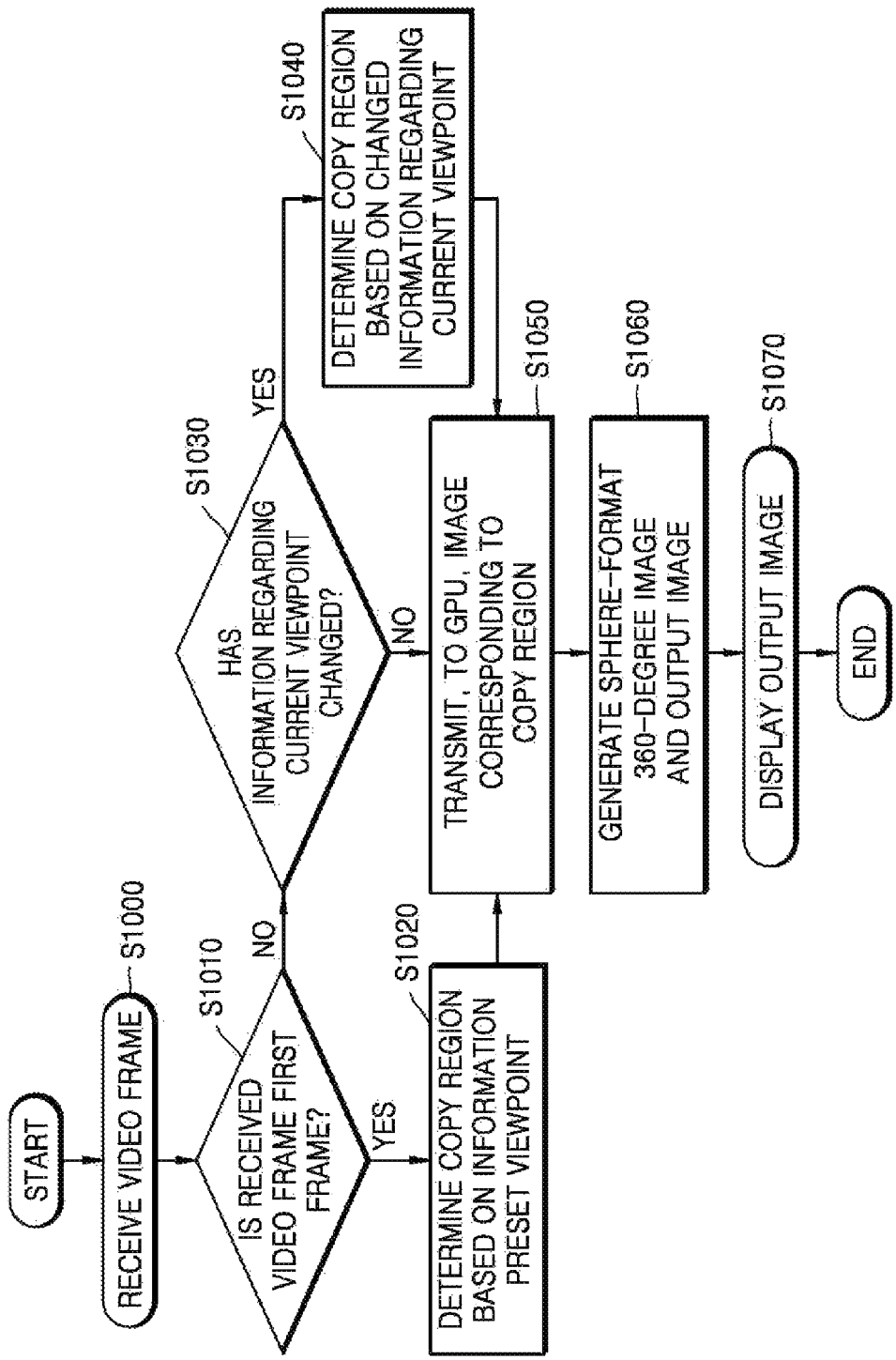
FIG. 10 is a flowchart of a method of displaying an image according to another example embodiment.

FIG. 10 is a flowchart of a method of displaying an image according to another example embodiment.

A 360-degree image displayed by the image display apparatus 100 may include a 360-degree video. The 360-degree video may include video frames. In this case, the image display apparatus 100 may reproduce the 360-degree video at a rate of tens of frames per second (fps). For example, when the 360-degree video is reproduced at a rate of 30 fps, graphic processing is performed on each video frame, and an amount of time taken to display each frame on the display 330 has to be within 33 ms. Thus, a method of decreasing an amount of time taken to perform graphic processing on each of received video frames is required so that the image display apparatus 100 may reproduce a 360-degree video without buffering.

The image display apparatus 100 may determine a copy region based on information regarding a current viewpoint with respect to each video frame and may transmit a region corresponding to the copy region to the GPU 320.

The image display apparatus 100 may determine whether the information regarding the current viewpoint has been changed with respect to each video frame and thus may reuse a previously determined copy region if the information regarding the current viewpoint has not been changed. Accordingly, an amount of time taken to perform graphic processing on each video frame may decrease.

In operation S1000, the image display apparatus 100 may receive a video frame.

In operation S1010, the image display apparatus 100 may check whether the received video frame is a first frame of the 360-degree video.

For example, when the received video frame is the first frame of the 360-degree video (S1010—yes), the information regarding the current viewpoint may not be stored. In this case, in operation S1020, the image display apparatus 100 may determine a copy region based on information regarding the previously determined viewpoint. For example, the image display apparatus 100 may set in advance, as the information regarding the previously determined viewpoint, a horizontal angle of 0 degrees, a vertical angle of 0 degrees, and an angle of view of 80 degrees. Accordingly, when the received video frame is the first frame of the 360-degree video, the image display apparatus 100 may determine the copy region having the horizontal angle of 0 degrees, the vertical angle of 0 degrees, and the angle of view of 80 degrees without waiting for a separate input.

In addition, the information regarding the previously determined viewpoint may differ according to a user input or internal settings of the image display apparatus 100.

When the received video frame is not the first frame of the 360-degree video (S1010—no), the image display apparatus 100 may check whether the information regarding the current viewpoint has changed (operation S1030).

When the information regarding the current viewpoint has been changed (S1030—no), the image display apparatus 100 does not have to change the copy region. Thus, the image display apparatus 100 may reuse the copy region that is determined with regard to a previous frame. However, when the information regarding the current viewpoint has changed (S1030—yes), the image display apparatus 100 may determine the copy region based on information regarding a changed current viewpoint (operation S1040).

In operation S1050, the image display apparatus 100 may transmit an image of the planar-format 360-degree image that corresponds to the copy region, to the GPU 320.

In operation S1060, the GPU 320 of the image display apparatus 100 may generate a sphere-format 360-degree image by mapping the image corresponding to the copy region and may generate an output image by rendering the sphere-format 360-degree image.

In operation S1070, the image display apparatus 100 may display the generated output image.

One or more example embodiments may also be embodied as programmed commands to be executed in various computer means, and then may be recorded to a non-transitory computer-readable recording medium. The non-transitory computer-readable recording medium may include one or more of the programmed commands, data files, data structures, or the like. The programmed commands recorded on the non-transitory computer-readable recording medium may be particularly designed or configured for one or more example embodiments or may be well known to one of ordinary skill in the art. Examples of the non-transitory computer-readable recording medium include magnetic media including hard disks, magnetic tapes, and floppy disks, optical media including CD-ROMs and DVDs, magneto-optical media including optical disks, and a hardware apparatus designed to store and execute the programmed commands in ROM, RAM, a flash memory, and the like. Examples of the programmed commands include not only machine codes generated by a compiler but also a high-level programming language to be executed in a computer by using an interpreter. The hardware apparatus may be configured to function as one or more software modules so as to perform operations of one or more example embodiments, or vice versa.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An image display apparatus comprising:
   a display;
   a graphics processing unit (GPU); and
   a processor configured to:
   receive a first planar-format image which is a first video frame among a plurality of video frames,
   control the GPU to:
   generate a sphere-format image by mapping a copy region image of the first planer-format image to a sphere, the copy region image being a partial image of the first planar-format image which is determined based on information regarding a current viewpoint,
   select a portion of the generated sphere-format image based on the information regarding the current viewpoint, and
   generate an output image by rendering the selected portion, and
   control the display to display the output image,
   wherein the processor is further configured to:
   receive a second planar-format image subsequent to the first video frame among the plurality of video frames; and
   in response to the current viewpoint being not changed, maintain the copy region for the second planer-format image.

2. The image display apparatus of claim 1, wherein the processor is further configured to:
   change the information regarding the current viewpoint in response to an input for changing a viewpoint, and
   change the copy region image based on the changed information regarding the current viewpoint.

3. The image display apparatus of claim 1, wherein the information regarding the current viewpoint comprises at least one of a horizontal angle, a vertical angle, an angle of view, and a distance from a central point of the sphere.

4. The image display apparatus of claim 1, wherein the processor is further configured to set a size of the copy region image to be greater than a size of a region corresponding to the output image.

5. The image display apparatus of claim 1, wherein the processor is further configured to, in response to the first planar-format image being an image corresponding to the first frame of video, determine the copy region image based on information regarding a preset viewpoint.

6. The image display apparatus of claim 5, wherein the information regarding the preset viewpoint varies according to at least one of a user input and an internal setting of the image display apparatus.

7. The image display apparatus of claim 1, further comprising a decoder configured to generate the first planar-format image by decoding an image received from an external source.

8. The image display apparatus of claim 1, wherein the processor is further configured to determine at least one of a shape and a size of the copy region image according to the information regarding the current viewpoint.

9. The image display apparatus of claim 1, wherein the sphere-format image comprises a sphere-format 360-degree image and the planar-format image comprises a planar-format 360-degree image.

10. A method of displaying an image, the method comprising:
    receive a first planar-format image which is a first video frame among a plurality of video frames;
    generating a sphere-format image by mapping a copy region image of the planer-format image to a sphere, the copy region image being a partial image of the planar-format image which is determined based on information regarding a current viewpoint;
    selecting a portion of the generated sphere-format image based on the information regarding the current viewpoint;
    generating an output image by rendering the selected portion; and
    displaying the output image;
    receiving a second planar-format image subsequent to the first video frame among the plurality of video frames; and
    in response to the current viewpoint being not changed, maintain the copy region for the second planer-format image.

11. The method of claim 10, further comprising:
    changing the information regarding the current viewpoint in response to an input for changing a viewpoint; and
    changing the copy region image based on the changed information regarding the current viewpoint.

12. The method of claim 10, wherein the information regarding the current viewpoint comprises at least one of a horizontal angle, a vertical angle, an angle of view, and a distance from a central point of the sphere.

13. The method of claim 10, further comprising setting a size of the copy region image to be greater than a size of a region corresponding to the output image.

14. The method of claim 10, further comprising, in response to the first planar-format image being an image corresponding to a first frame of video, determining the copy region image based on information regarding a preset viewpoint.

15. The method of claim 14, wherein the information regarding the preset viewpoint varies according to at least one of a user input and an internal setting of an image display apparatus.

16. The method of claim 10, wherein at least one of a shape and a size of the copy region image is determined according to the information regarding the current viewpoint.

17. The method of claim 10, wherein the sphere-format image comprises a sphere-format 360-degree image and the planar-format image comprises a first planar-format 360-degree image.

18. A non-transitory computer-readable recording medium having embodied thereon a program which, when executed by a computer, performs the method of claim 10.

* * * * *